United States Patent
Stearns

[19]

[11] Patent Number: 5,865,214
[45] Date of Patent: Feb. 2, 1999

[54] DUCTWORK TEST PORT KIT

[75] Inventor: David P Stearns, Colchester, Vt.

[73] Assignee: GDS Manufacturing Co., Williston, Vt.

[21] Appl. No.: 858,266

[22] Filed: May 19, 1997

[51] Int. Cl.$^6$ .................................................. F16L 55/10
[52] U.S. Cl. .................................. 138/89; 138/90; 138/92
[58] Field of Search ................................. 138/89, 90, 92

[56] References Cited

U.S. PATENT DOCUMENTS

| | | | |
|---|---|---|---|
| 3,981,322 | 9/1976 | Gebelius | 137/318 |
| 3,999,785 | 12/1976 | Blakeley | 285/111 |
| 4,043,333 | 8/1977 | Munsch | 604/86 |
| 4,112,944 | 9/1978 | Williams | 604/244 |
| 4,186,645 | 2/1980 | Zaydel | 85/83 |
| 4,411,459 | 10/1983 | Ver Nooy | 285/197 |
| 4,537,214 | 8/1985 | Cowan | 137/318 |
| 4,620,576 | 11/1986 | Owen, Jr. | 141/1 |
| 4,752,387 | 6/1988 | Thomas | 210/168 |
| 4,955,406 | 9/1990 | Antoniello | 137/318 |
| 5,273,077 | 12/1993 | Oropallo | 138/90 |
| 5,301,532 | 4/1994 | Bickmore et al. | 72/325 |
| 5,547,042 | 8/1996 | Platt | 138/89 X |
| 5,628,601 | 5/1997 | Pope | 138/89 X |
| 5,701,935 | 12/1997 | Vesudeva | 138/89 |

OTHER PUBLICATIONS

GDS Manufacturing Company, Kem–Tuff™ Standards page with designation TP (dated Jul. 11, 1996).
GDS Manufacturing, Installation Instruction for Kem–Tuff™ Field Test Ports (dated Nov. 6, 1996).

*Primary Examiner*—Patrick F. Brinson
*Attorney, Agent, or Firm*—Theodore R. Touw

[57] ABSTRACT

A corrosion-resistant test port kit is specially adapted to be retrofitted into existing duct work for use in testing or monitoring gases and vapors in an exhaust air transfer system that is designed to handle a wide range of potentially corrosive exhaust streams found in a wide variety of industrial applications. The apparatus provides the ability to install the test port kit in existing duct systems quickly and easily to monitor the gas stream without having to disassemble the duct system or interrupt its use for long periods. The test port kit has a corrosion-resistant threaded test port sleeve with a mounting shoulder, a corrosion-resistant shouldered washer that fits over the threaded test port sleeve and is disposed opposite the shoulder of the sleeve with the shouldered side of the washer facing away from the shoulder of the sleeve, a corrosion-resistant threaded nut to hold the test port in place in a hole in the duct system which is to be tested, a corrosion-resistant plug to block the test port when the test port is not in use for testing, and an installation tool.

13 Claims, 2 Drawing Sheets

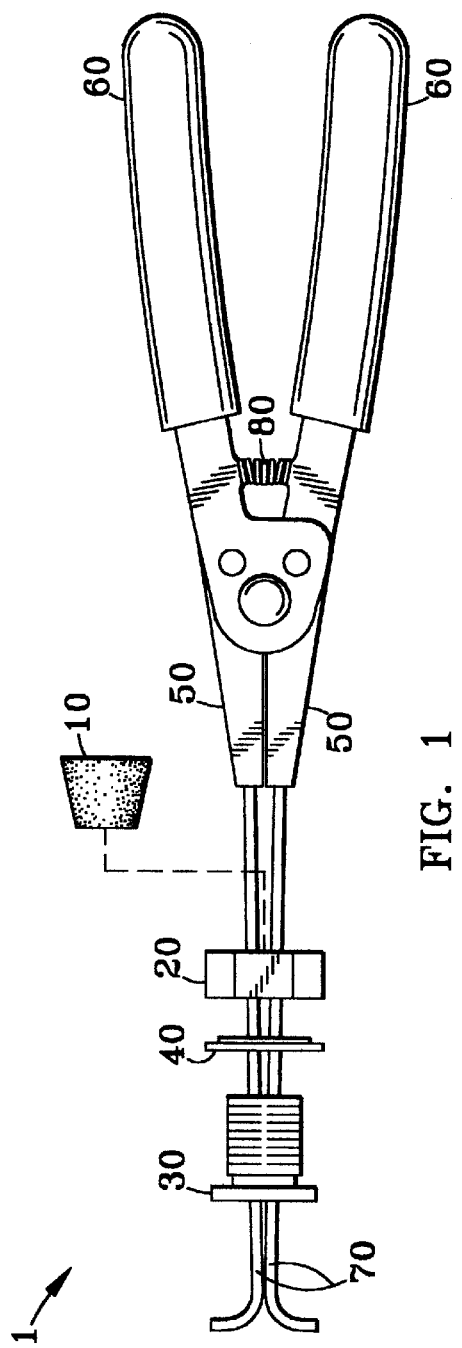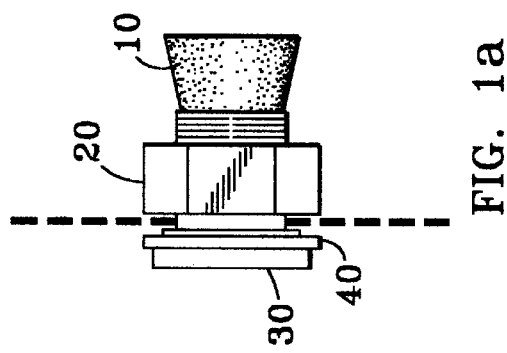

DUCTWORK TEST PORT KIT

FIELD OF THE INVENTION

The present invention relates to a test port kit, and more particularly pertains to a corrosion-resistant test port kit for use in air handling duct systems.

BACKGROUND OF THE INVENTION

The use of field-installed test ports is known in the prior art. For example, U.S. Pat. No. 4,411,459 to Ver Nooy discloses a branch fitting for accessing the interior of a pipe which may be used as a test port. Specialized tools or valve parts used to pierce or otherwise provide a tapping means of a closed air or fluid system are similarly disclosed in U.S. Pat. No. 5,301,532 to Bickmore et al. (Device for tube piercing and fluid irrigation); U.S. Pat. No. 4,955,406 to Antoniello (Connector device for water pipes); U.S. Pat. No. 4,752,387 to Thomas (Device and method for installing a by-pass filter); U.S. Pat. No. 4,620,576 to Owen, Jr. (Device and method for piercing a container); U.S. Pat. No. 4,537,214 to Cowan (Single seal pipeline tapping device with secure valve); U.S. Pat. No. 4,112,944 to Williams (Tube clamp and piercing device); U.S. Pat. No. 4,043,333 to Munsch (Clamp on injection site device); U.S. Pat. No. 3,999,785 to Blakeley (Mechanical pipe outlet device); and U.S. Pat. No. 3,981,322 to Gebelius (Pipe connecting device). Thus the basic concept of field-installed access to the interior environment of an existing pipe or duct system is known. Each of these prior art patents discloses apparatus designed to tap into an existing pipe or duct system. Each apparatus fulfills its respective particular objectives and requirements and is most likely quite functional for its intended purposes. It will be noticed that none of the prior art cited discloses an apparatus that allows a user to efficiently and inexpensively install a corrosion-resistant test port in an existing exhaust air transfer ductwork system which is designed to handle a wide range of corrosive exhaust streams which may be found in a wide variety of industrial applications. There apparently still exists the need for new and improved test ports and installation kit apparatus operable with an existing exhaust air transfer system that is designed to handle a wide range of corrosive exhaust streams without having to customize a test port or otherwise custom cut the duct carrying the gas stream to be monitored. The present invention substantially fulfills this need.

SUMMARY OF THE INVENTION

In view of the limitations inherent in the known types of test ports now present in the prior art, the present invention provides an apparatus specifically adapted for use with exhaust air transfer systems handling potentially corrosive exhaust streams. The invention provides improvements over similar devices which may already be disclosed or commercially available. A general purpose of the present invention, which will be described subsequently in greater detail, is to provide an apparatus that incorporates the corrosion-resistant qualities of custom-made test ports of the prior art in a design compatible with standardization of air transfer systems to create a corrosion-resistant test port that is inexpensive and easy to install in new or existing air transfer systems. There are many additional novel features directed to solving problems not addressed in the prior art.

The present invention generally comprises a corrosion-resistant threaded test port sleeve with a mounting shoulder, a corrosion-resistant shouldered washer that fits over the threaded test port sleeve and is disposed opposite the shoulder of the test port sleeve with the shouldered side of the washer facing away from the shoulder of the test port sleeve, a corrosion-resistant threaded nut to hold the test port in place in a hole in the duct system which is to be tested, a corrosion-resistant plug to block the test port when the port is not in use for testing, and an installation tool.

It is therefore an object of the present invention to provide a test port kit which has many of the advantages of the apparatuses mentioned heretofore and many novel features. It is another object of the present invention to provide a new test port kit apparatus which may be easily and efficiently manufactured and marketed. It is a further object of the present invention to provide a new test port kit apparatus which is of a durable and reliable construction and has a simple method of installation into existing ductwork. An important object is a test port kit which provides a seal against the interior surface of the ductwork, to prevent chemical attack of the substrate material of the ductwork after the ductwork wall is penetrated. A related object is a test port kit which is specially adapted for use with ductwork having a corrosion-resistant coating on its interior surface, such as ductwork commonly used in semiconductor fabrication facilities and the like. Another object of the present invention is to provide a test port kit apparatus which allows a low cost of manufacture with regard to both materials and labor, and which accordingly then allows for low prices of sale, thereby making such test port kit apparatuses economically available to the public. Yet another object of the present invention is to provide a test port kit apparatus which provides in the apparatuses and methods of the prior art some of the advantages thereof, while simultaneously overcoming some of the disadvantages normally associated therewith. These, together with other objects of the invention and along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter illustrating preferred embodiments of the invention.

BRIEF DESCRIPTION OF THE DRAWINGS

The invention will be better understood and objects other that those set forth above will become apparent when consideration is given to the following detailed description and to the accompanying drawings wherein:

FIG. 1 is a side elevation view of a test port kit apparatus made in accordance with the present invention;

FIG. 1a is a side elevation view of portions of the apparatus in FIG. 1 in their assembled configuration;

DESCRIPTION OF PREFERRED EMBODIMENTS

Figure 2:
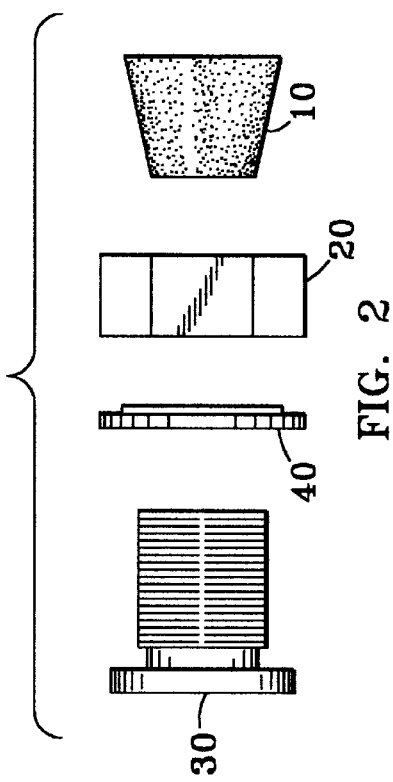
FIG. 2 is an exploded view of portions of the apparatus in FIG. 1.
Figure 3:
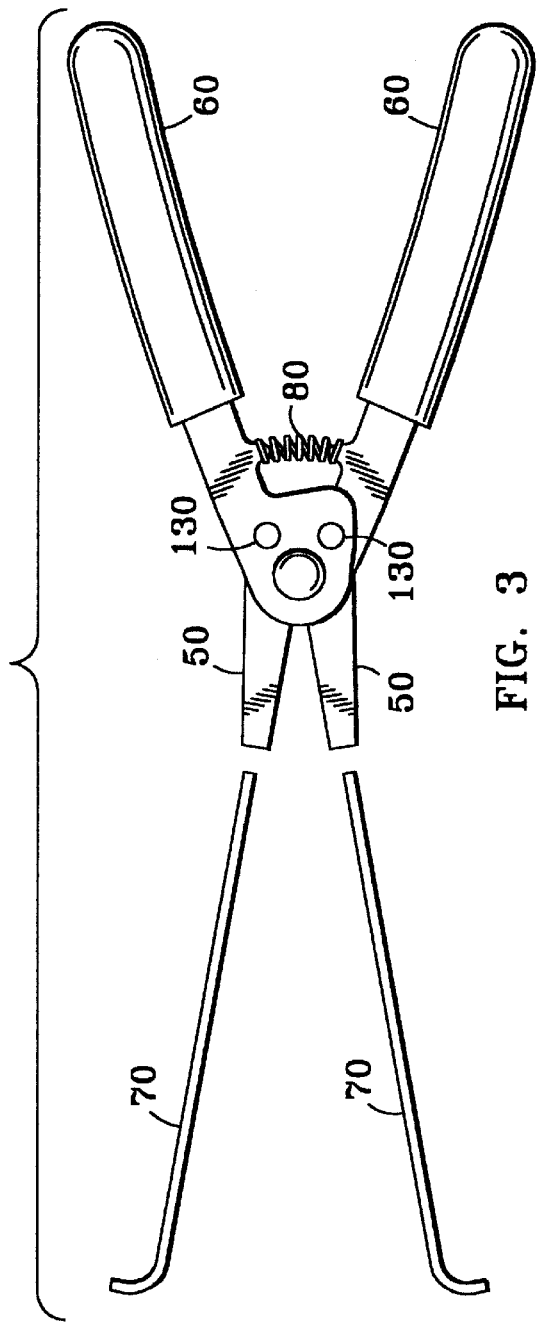
FIG. 3 is an exploded view of an installation tool made in accordance with the present invention.

With reference now to the drawings, and in particular to FIGS. 1–3, a new corrosion-resistant test port kit apparatus embodying the principles and concepts of the present invention and generally designated by the reference numeral 1 in FIGS. 1–3 will be described. The apparatus generally comprises a corrosion-resistant threaded test port sleeve with a mounting shoulder, a corrosion-resistant shouldered washer that fits over the threaded test port sleeve and is disposed opposite the shoulder of the test port sleeve with the shouldered side of the washer facing away from the shoulder of the test port sleeve, a corrosion-resistant threaded nut to hold the test port in place in a hole in the duct system to be tested, a corrosion-resistant plug to block the test port when not in use for testing, and an optional installation tool specially adapted for installing the other parts.

FIGS. 1–3 show the most preferred embodiment of an apparatus 1 made in accordance with this invention for a corrosion-resistant test port kit. Test port apparatus 1 comprises a number of primary components, including a suitably tapered corrosion-resistant plug 10 that fits snugly by friction inside a suitably rigid corrosion-resistant sleeve 30. Sleeve 30 has an externally threaded end 50 and a shouldered end 60. The inside surface of the shoulder of shouldered end 60 faces shoulder 120 of a corrosion-resistant and suitably flexible shouldered washer 40 when the sleeve 30 is inserted through shouldered washer 40. (Sleeve 30 is inserted into the shoulder side of shouldered washer 40.) A hole 35 of suitable size to accommodate sleeve 30 portion of the apparatus 1 is drilled into the duct system 45 to be monitored and tested. Hole 35 is preferably deburred. In the following sequence, a suitably rigid corrosion-resistant nut 20, shouldered washer 40 with the shoulder 120 facing the nut 20, and test port sleeve 30 with the threaded end 50 facing the nut 20 are arranged with their axes aligned, and shouldered washer 40 is pinched in order that it may be inserted completely through the hole 35. Test port sleeve 30 is drawn back in a direction toward the hole, thus drawing the test port sleeve 30 through the shouldered washer 40 with the test port sleeve shoulder 60 seating against the shouldered washer 40. Shouldered washer 40 in turn seats against the inside of the duct with the shoulder 120 projecting into the hole. Threaded end 50 of the test port sleeve 30 extends through the hole outside the duct, and the nut 20 is tightened thereon, securing the test port portion of the apparatus 1 securely to the duct 45 in an air-tight fashion. The installation is now complete and there is a sealable port available in the duct. Once testing is completed the port is sealed by the friction fitting tapered plug 10, which may be easily removed for subsequent further testing.

The process of assembling and installing the test port kit is greatly facilitated by using installation tool 70, which is specially designed for this purpose, to temporarily hold sleeve 30 while shouldered washer 40 is pressed against the interior surface of said existing ductwork and while internally threaded nut 20 is tightened against the exterior surface of ductwork 45. To align the axes of the various parts, nut 20, shouldered washer 40 with the shoulder 120 facing the nut 20, and test port sleeve 30 with the threaded end 50 facing the nut 20 are placed over retention prongs 110 of installation tool 70 by passing retention prongs 110 through the center bores of each of the nut 20, the shouldered washer 40 and the test port sleeve 30 while the upper handle 80 and the lower handle 100 of the installation tool 70 are held in a desired position for insertion of the test port into the hole 35 previously drilled in the duct work. As the retention prongs 110 are passed through the hole in the duct with the test port sleeve 30 thereon, shouldered washer 40 is pinched in order that it may be inserted completely through the hole 35. The installation tool 70 retention prongs 110 are then drawn back in a direction out of the hole, drawing test port sleeve 30 back in a direction toward the hole, thus drawing the test port sleeve 30 through the shouldered washer 40 with the test port sleeve shoulder 60 seating against the shouldered washer 40. Shouldered washer 40 in turn seats against the inside of the duct with the shoulder 120 projecting into the hole. Threaded end 50 of the test port sleeve 30 extends through the hole outside the duct, and the nut 20 is tightened thereon, securing the test port portion of the apparatus 1 securely to the duct 45. The installation tool 70 is then adjusted to draw the retention prongs 110 together in order that the retention prongs 110 may be removed from the test port.

Test port sleeve 30, shouldered washer 40 and nut 20 are formed from suitably corrosion-resistant materials, preferably polytetrafluorethylene (PTFE). Plug 10 is formed of a suitably resilient corrosion-resistant material which may also be polytetrafluorethylene (PTFE) or preferably an elastomer such as neoprene or silicone rubber.

Installation tool 70 provides for temporarily holding sleeve 30 and the other parts of the test port kit by using two retention prongs 110. As illustrated in FIG. 3, installation tool 70 is preferably made with removable and replaceable retention prongs 110. Installation tool 70 has at least one handle 80 or 100 and preferably two handles 80 and 100 like the handles of pliers, pivotably connected to each other. Each of the retention prongs is movable between a first position and a second position, such that the retention prongs fit through the bore of sleeve 30, the hole of shouldered washer 40, and the internally threaded nut 20 when retention prongs 110 are disposed in the first position (relatively near each other). Retention prongs 110 are preferably disposed contiguous to each other or overlapped when in the first position, like the blades of a closed pair of scissors. Retention prongs 110 engage the shoulder of sleeve 30 when the retention prongs are disposed in the second position (relatively far from each other). Retention prongs 110 diverge from each other when in the second position, like the blades of an open pair of scissors. As illustrated in FIG. 3, the retention prongs are moved using a pair of handles 80 and 100 like the handles of a pair of pliers, pivotably connected one to the other. Each of the retention prongs 110 is preferably made from a rigid material such as steel or other metal, rigid plastic or other rigid synthetic material. Each of the retention prongs 110 is preferably made by forming an L-shaped element having a longitudinal leg, longer than the length of the cylindrical test port sleeve 30, and a transverse leg shorter than one-half of the inner diameter of cylindrical sleeve 30. As illustrated in the FIGS. 1 and 3, the transverse legs of retention prongs 110 are preferably oriented away from each other. Installation tool 70 may conveniently be made by modifying a conventional pair of pliers. This is an especially convenient way to provide for removable and replaceable retention prongs 110, which can then be changed to fit different size test port kits designed for various applications. Installation tool 70 may also be made to have a locking feature, whereby retention prongs 110 may be closed together or moved apart to a desired relative position and then locked in a desired position by locking means 130 and locking-means adjustment mechanism 90. This can be done by modifying a pair of locking pliers, for example, or by providing a separate or integral locking mechanism of a type known in the art. Depending on the pivoting mechanism, the two retention prongs may be moved into their "closed," overlapping, or near position by moving the plier handles apart and may be moved into their "open," diverging, or far-apart position by moving the plier handles together, for example. Alternatively, with another arrangement such as a double pivot, the two retention prongs may be moved into their "closed," overlapping, or near position by moving the plier handles together and may be moved into in their "open," diverging, or far-apart position by moving the plier handles apart.

The test port kit is easy to use. The special utility of this apparatus includes the ability to install the test port kit in existing duct systems quickly and easily to monitor the gas stream without having to disassemble the duct system or interrupt its use for long periods. In use, the kit is assembled and installed simultaneously using the procedure described above, viz. while holding the handle(s) 80 and/or 100, the user places in order the nut 20, the shouldered washer 40 and the test port sleeve 30 on the retention prongs by moving the retention prongs 110 into the first position such that the retention prongs may be inserted first through the internally threaded nut, then through the hole of the shouldered washer from the first side to the second side, and then through the bore of the sleeve from the second end to the first end. The user then moves the retention prongs into their second position to engage the sleeve shoulder; the user inserts the aligned set through the hole in the ductwork, and the user tightens nut 20 while pressing shouldered washer 40 against the interior surface of the ductwork 45 to complete installation of the test port 1. Typically, when the user suitably tightens nut 20, shouldered washer 40 seals against the interior surface of the ductwork and against the edge of the hole made in the ductwork, while the shoulder of sleeve 70 seals against the exterior surface of the ductwork. Thus the test port kit provides a seal against the interior surface of the ductwork and against the edge of the penetration hole, to prevent chemical attack of the substrate material of the ductwork. This makes the test port kit especially suitable for use with ductwork having a corrosion-resistant coating on its interior surface, such as ductwork commonly used in semiconductor fabrication facilities and the like.

The user then adjusts the retention prongs toward each other sufficiently to clear the sleeve's bore inner diameter, and the prongs are removed from the bore of the test port sleeve. The test port is then used for access into the duct or else the test port is closed with plug 10 of suitably resilient material placed snugly into and filling the bore of the threaded end of the test port sleeve.

From the foregoing description, one skilled in the art can easily ascertain the essential characteristics of this invention, and without departing from the spirit and scope thereof, can make various changes and modifications of the invention to adapt it to various usages and conditions. Other embodiments of the invention will be apparent to those skilled in the art from a consideration of this specification or from practice of the invention disclosed herein. For example, a similar construction and installation method may be adapted and applied to a test port for pipe systems carrying liquids. For another example, the installation tool may be made to hold appropriate parts of the ductwork test port kit in place during assembly by means of springs, extendable arms, inflatable members, magnets, adhesive tape, or other holding means known in the art. It is intended that the specification and examples be considered as exemplary only, with the true scope and spirit of the invention being defined by the appended claims.

I claim:

1. A ductwork test port kit for installing a test port into a test hole made in existing ductwork having inner and outer duct surfaces, said ductwork test port kit comprising:
    a) a cylindrical sleeve having inner and outer diameters, having first and second ends, having a sleeve shoulder adjacent to said first end for sealing against one of said inner and outer duct surfaces, having an externally threaded portion adjacent to said second end, and having a bore extending therethrough and communicating with said first and second ends;
    b) a shouldered washer of suitably resilient material, said shouldered washer having a hole fitting over said outer diameter of said sleeve, having first and second sides, and having a washer shoulder adjacent to said first side for sealing against one of said inner and outer duct surfaces;
    c) an internally threaded nut for threading onto said threaded portion of said cylindrical sleeve to hold said test port in said test hole of said existing ductwork; and
    d) a tapered plug of suitable diameters to fit removably into said bore for selectively plugging said bore.

2. A ductwork test port kit as recited in claim 1, further comprising:
    e) an installation tool having means for temporarily holding said sleeve while said shouldered washer is pressed against the interior surface of said existing ductwork and while said internally threaded nut is tightened against the exterior surface of said existing ductwork, whereby said test port is installed.

3. A ductwork test port kit as recited in claim 2, wherein the installation tool comprises:
    a) at least one handle and
    b) at least two retention prongs, each of said retention prongs being movable between first and second positions, such that said retention prongs fit through the bore of said sleeve, the hole of said shouldered washer, and the internally threaded nut when said retention prongs are disposed in said first position, and such that said retention prongs engage said sleeve shoulder when said retention prongs are disposed in said second position, thereby providing said means for temporarily holding said sleeve.

4. A method for installing the ductwork test port kit of claim 2, comprising the steps of:
    a) placing in order the nut, the shouldered washer and the test port on the retention prongs by disposing the retention prongs in said first position such that the retention prongs may be inserted through the internally threaded nut, then through the hole of the shouldered washer from the first side to the second side, and then through the bore of the sleeve from the second end to the first end;
    b) disposing the retention prongs in their second position to engage the sleeve shoulder;
    c) tightening the nut while pressing the shouldered washer against the interior surface of said existing ductwork to complete installation of the test port.

5. A ductwork test port kit as recited in claim 3, wherein said at least one handle of the installation tool comprises:
    a pair of plier handles pivotably connected one to the other.

6. A ductwork test port kit as recited in claim 3, wherein each of said retention prongs comprises:
    an L-shaped element having a first leg longer than the length measured between said first and second ends of said cylindrical sleeve, and a second leg shorter than one-half of said inner diameter of said cylindrical sleeve.

7. A ductwork test port kit as recited in claim 3, further comprising locking means for locking said retention prongs in a desired position.

8. A ductwork test port kit as recited in claim 5, wherein said at least two retention prongs comprise two retention prongs, said two retention prongs being removably attached, one to each of said plier handles.

9. A ductwork test port kit as recited in claim 5, wherein said two retention prongs are disposed in said first position by moving said plier handles apart, and said two retention prongs are disposed in said second position by moving said plier handles together.

10. A ductwork test port kit as recited in claim 5, wherein said two retention prongs are disposed in said first position by moving said plier handles together, and said two retention prongs are disposed in said second position by moving said plier handles apart.

11. A ductwork test port kit as recited in claim 6, wherein each of said retention prongs is disposed with said second leg oriented away from the other of said retention prongs.

12. A ductwork test port kit for installing a test port into a test hole made in existing ductwork having inner and outer duct surfaces, said ductwork test port kit comprising:
   a) a cylindrical sleeve having inner and outer diameters, having first and second ends, having a sleeve shoulder adjacent to said first end for sealing against one of said inner and outer duct surfaces, having an externally threaded portion adjacent to said second end, and having a bore extending therethrough and communicating with said first and second ends;
   b) a shouldered washer of suitably resilient material, said shouldered washer having a hole fitting over said outer diameter of said sleeve, having first and second sides, and having a washer shoulder adjacent to said first side for sealing against one of said inner and outer duct surfaces;
   c) an internally threaded nut for threading onto said threaded portion of said cylindrical sleeve to hold said test port in said test hole of said existing ductwork;
   d) a tapered plug of suitable diameters to fit removably into said bore for selectively plugging said bore; and
   e) an installation tool having means for temporarily holding said sleeve while said shouldered washer is pressed against the interior surface of said existing ductwork and while said internally threaded nut is tightened against the exterior surface of said existing ductwork, wherein the installation tool comprises:
      i) a pair of handles pivotably connected one to the other and
      ii) at least two retention prongs, each of said two retention prongs being removably attached, one to each of said handles, and each of said retention prongs being movable between first and second positions, such that said retention prongs fit through the bore of said sleeve, the hole of said shouldered washer, and the internally threaded nut when said retention prongs are disposed in said first position, and such that said retention prongs engage said sleeve shoulder when said retention prongs are disposed in said second position,
   wherein each of said retention prongs comprises:
      an L-shaped element having a first leg longer than the length measured between said first and second ends of said cylindrical sleeve, and a second leg shorter than one-half of said inner diameter of said cylindrical sleeve, thereby providing said means for temporarily holding said sleeve while said test port is installed.

13. A ductwork test port kit as recited in claim 12, further comprising locking means for locking said retention prongs in a desired position.

\* \* \* \* \*